United States Patent
Maruhashi

(10) Patent No.: US 9,923,604 B2
(45) Date of Patent: Mar. 20, 2018

(54) POWER TRANSMITTING APPARATUS, POWER TRANSMITTING METHOD, AND STORAGE MEDIUM

(71) Applicant: CANON KABUSHIKI KAISHA, Tokyo (JP)

(72) Inventor: Kazuaki Maruhashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 14/273,324

(22) Filed: May 8, 2014

(65) Prior Publication Data
US 2014/0333131 A1    Nov. 13, 2014

(30) Foreign Application Priority Data
May 10, 2013    (JP) .................................. 2013-100390

(51) Int. Cl.
| | |
|---|---|
| H04B 5/00 | (2006.01) |
| H02J 50/80 | (2016.01) |
| H02J 50/40 | (2016.01) |
| H02J 50/10 | (2016.01) |
| H02J 7/02 | (2016.01) |
| H02J 5/00 | (2016.01) |

(52) U.S. Cl.
CPC ............ *H04B 5/0037* (2013.01); *H02J 5/005* (2013.01); *H02J 7/025* (2013.01); *H02J 50/10* (2016.02); *H02J 50/40* (2016.02); *H02J 50/80* (2016.02); *H04B 5/0031* (2013.01); *H04B 5/0075* (2013.01); *Y10T 307/25* (2015.04)

(58) Field of Classification Search
CPC ....................................................... H02J 17/00
USPC .................................................... 307/104, 11
See application file for complete search history.

(56) References Cited

U.S. PATENT DOCUMENTS

2007/0021140 A1*  1/2007  Keyes, IV .............. H02J 17/00
                                                                                  455/522
2008/0092638 A1*  4/2008  Brenneman ......... G06F 19/3418
                                                                                  73/61.41

(Continued)

FOREIGN PATENT DOCUMENTS

JP         2009-136132 A      6/2009
JP         2011509067 A       3/2011

(Continued)

*Primary Examiner* — Rexford Barnie
*Assistant Examiner* — Joseph Inge
(74) *Attorney, Agent, or Firm* — Canon U.S.A., Inc. IP Division

(57) ABSTRACT

A power transmitting apparatus, which simultaneously or sequentially supplies electric power to a plurality of power receiving apparatuses in a wireless manner, includes a power transmitting unit configured to transmit electric power to the plurality of power receiving apparatuses, a reception unit configured to receive a power transmission end request and an abnormality content regarding power transmission from a first power receiving apparatus from among the plurality of power receiving apparatuses, and a power transmission determination unit configured, based on the abnormality content, to determine whether to stop power transmission to power receiving apparatuses that have not completed power transmission and that are not the first power receiving apparatus from among the plurality of power receiving apparatuses.

6 Claims, 12 Drawing Sheets

(56) References Cited

U.S. PATENT DOCUMENTS

| | | | | |
|---|---|---|---|---|
| 2009/0127936 A1* | 5/2009 | Kamijo | ............... | H02J 7/025 307/104 |
| 2010/0244576 A1* | 9/2010 | Hillan | ............... | G06K 7/0008 307/104 |
| 2013/0221915 A1* | 8/2013 | Son | ............... | H02J 7/025 320/108 |

FOREIGN PATENT DOCUMENTS

| | | |
|---|---|---|
| JP | 2012-44735 A | 3/2012 |
| JP | 2013081363 A | 5/2013 |

\* cited by examiner

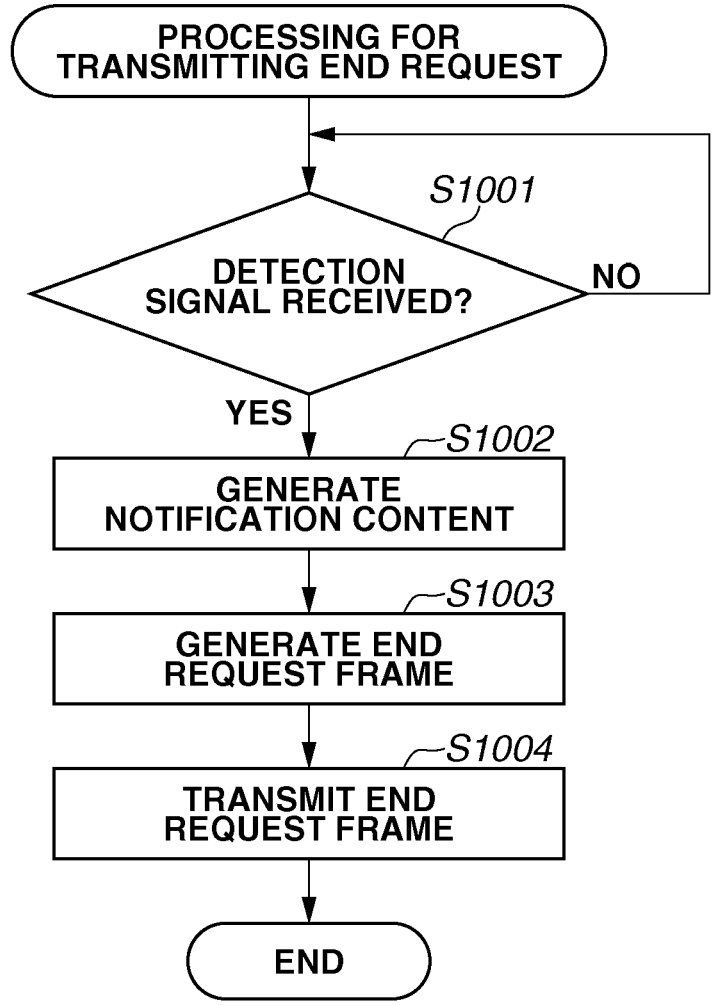

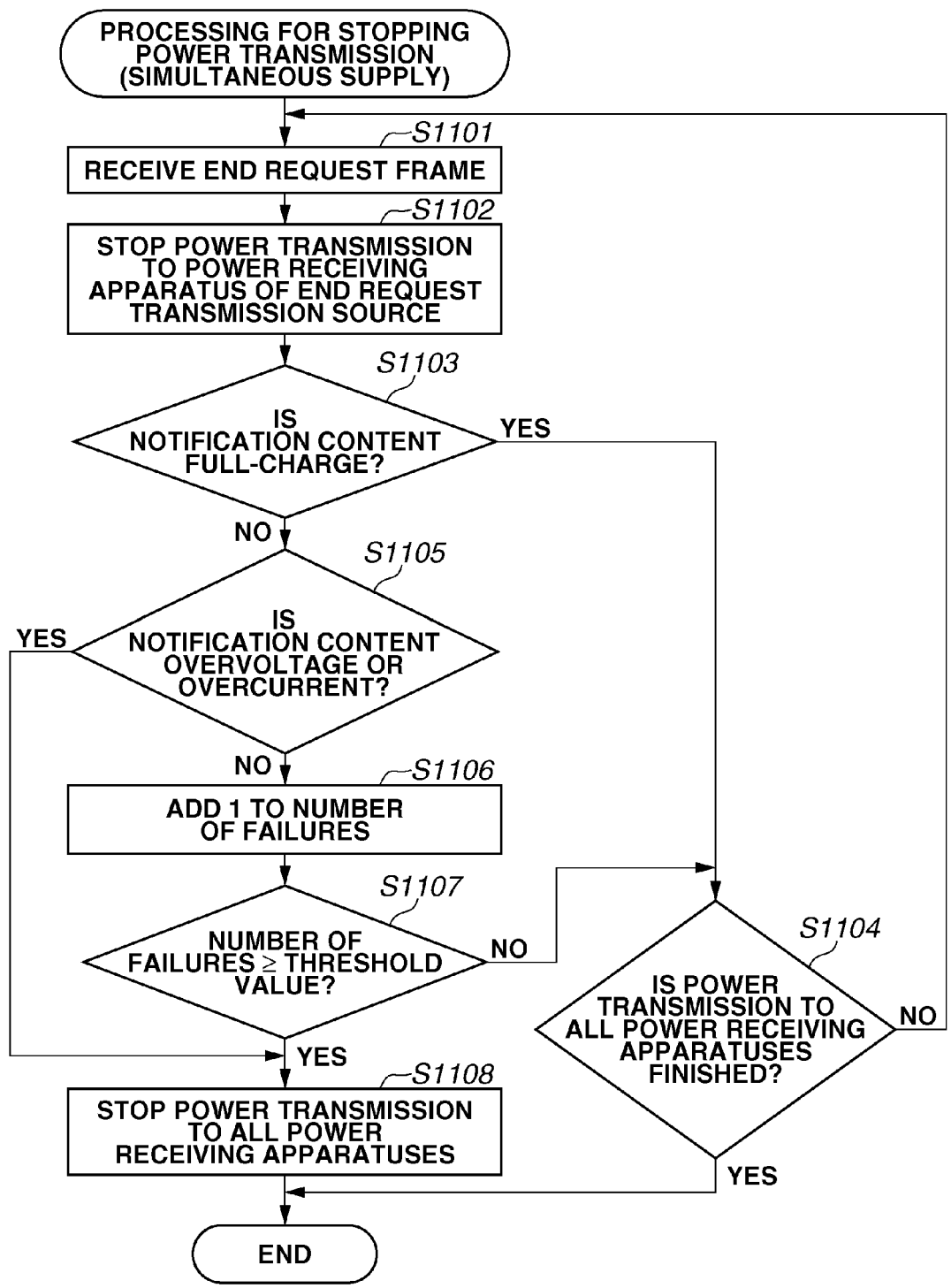

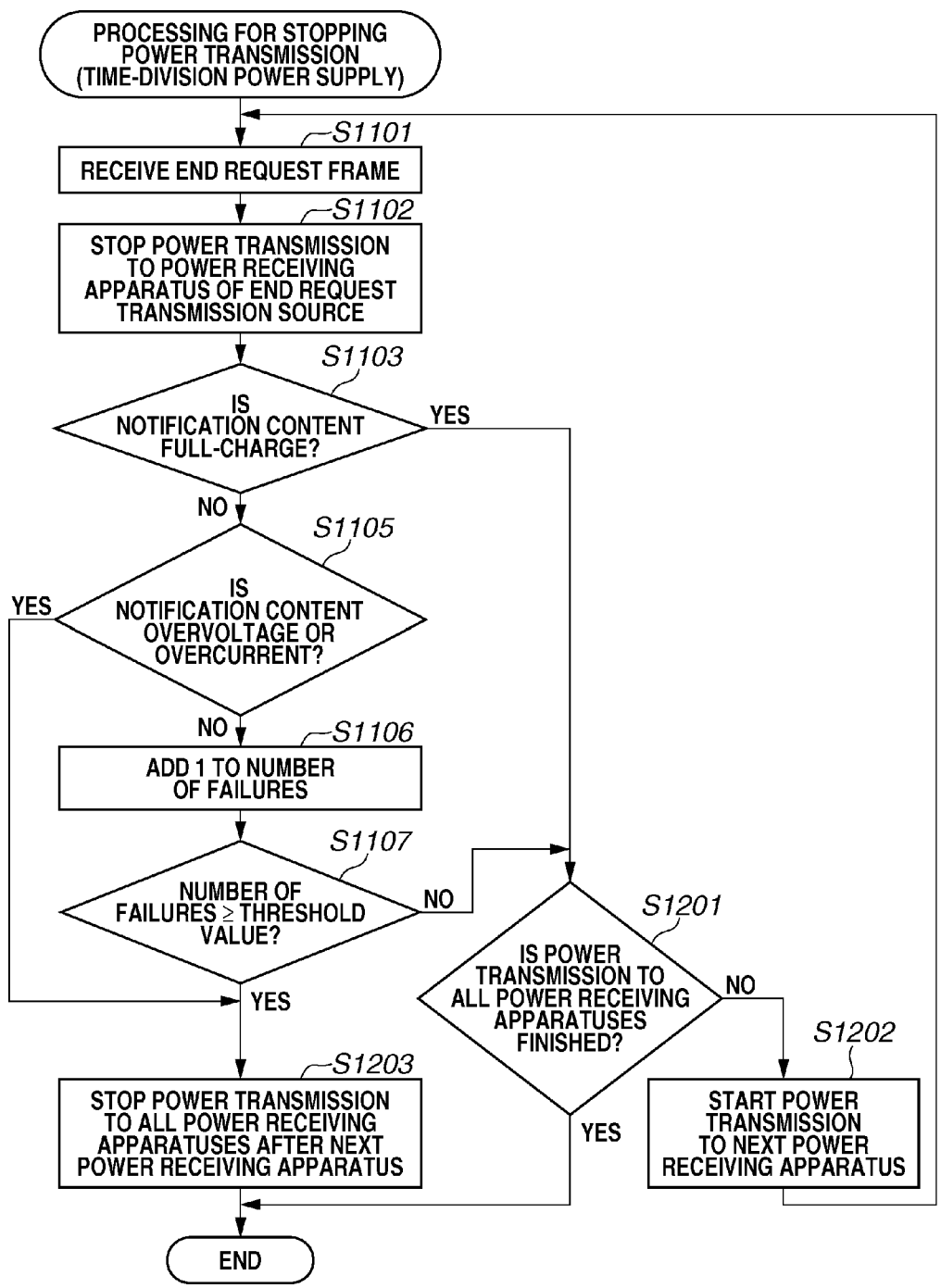

POWER TRANSMITTING APPARATUS, POWER TRANSMITTING METHOD, AND STORAGE MEDIUM

BACKGROUND

Field

Aspects of the present invention generally relate to a power transmitting apparatus, a power transmitting method, and a storage medium.

Description of the Related Art

Conventionally, there has been provided a technique for supplying electric power in a non-contact manner (a wireless manner). There are four types of non-contact power supply methods, that is, an electromagnetic induction method, a magnetic field resonance method, an electric field coupling method, and a radio wave receiving method. Among these methods, the magnetic field resonance method can transmit a sufficient amount of electric power over a long distance as its feature. With such characteristics, the magnetic field resonance method has particularly received attention among these four methods. In the magnetic field resonance method, a one-to-N power transmission method using the characteristic of long-distance power transmission has been discussed (see, e.g., Japanese Patent Application Laid-Open No. 2009-136132). The one-to-N power transmission method enables a power transmitting apparatus to wirelessly transmit electric power to a plurality of power receiving apparatuses.

The one-to-N power transmission includes a simultaneous power supply method and a time-division power supply method. In the simultaneous power supply method, the power transmitting apparatus simultaneously supplies electric power to the plurality of power receiving apparatuses, whereas in the time-division power supply method, the power transmitting apparatus sequentially supplies electric power to each of the power receiving apparatuses. The power receiving apparatus includes a power storage device such as a secondary battery mounted therein. The power receiving apparatus stores power in the power storage device using any of the simultaneous power supply method and the time-division power supply method. Among power storage devices, the secondary battery in particular needs to avoid being overcharged, over-discharged, and a rise in ambient temperature thereof. In such a non-contact power supply method, therefore, both of the power transmitting apparatus and the power receiving apparatus need to have functions of stopping power supply in case of abnormality.

The wireless power consortium (WPC) has developed a non-contact charging standard called "Qi". With the "Qi" standard, a method for stopping the power supplied to a power receiving apparatus is discussed. According to this method, a power transmitting apparatus stops supplying the power in response to a request from the power receiving apparatus. Moreover, Japanese Patent Application Laid-Open No. 2012-44735 discusses a power supply stop method performed by a power receiving apparatus. According to this method, in a case where the power receiving apparatus detects any abnormality while electric power is being supplied, the power receiving apparatus stops the power supplied thereto. Japanese Patent Application Laid-Open No. 2012-44735 also discusses a method performed by a power transmitting apparatus which supplies power to a plurality of power receiving apparatuses using a time-division power supply method. In a case where one of the plurality of power receiving apparatuses stops the power supplied thereto, the power transmitting apparatus performs shift processing so that the power is supplied to another power receiving apparatus.

However, there are cases where the power transmitting apparatus is a cause of a power supply abnormality. In such a case, a similar abnormality may occur again if the power transmitting apparatus continues the power supply processing. The reoccurrence of the abnormality is not desirable.

SUMMARY

Aspects of the present invention are generally directed to a configuration for enabling appropriate processing to be performed in a case where an abnormality in power transmission occurs.

According to an aspect of the present invention, a power transmitting apparatus, which simultaneously or sequentially supplies electric power to a plurality of power receiving apparatuses in a wireless manner, includes a power transmitting unit configured to transmit electric power to the power receiving apparatuses, a reception unit configured to receive a power transmission end request and an abnormality content regarding power transmission from a first power receiving apparatus among the plurality of power receiving apparatuses, and a power transmission determination unit configured, based on the abnormality content, to determine whether to stop power transmission to the power receiving apparatuses which have not completed power transmission thereto and are other than the first power receiving apparatus among the plurality of power receiving apparatuses.

Further features of the present disclosure will become apparent from the following description of exemplary embodiments with reference to the attached drawings.

BRIEF DESCRIPTION OF THE DRAWINGS

FIG. 10 is a flowchart illustrating end request transmission processing.

FIG. 11 is a flowchart illustrating power transmission stop processing performed when power is supplied in a simultaneous manner.

FIG. 12 is a flowchart illustrating power transmission stop processing performed when power is supplied in a time-division manner.

DESCRIPTION OF THE EMBODIMENTS

Various exemplary embodiments will be described in detail below with reference to the drawings.

Figure 1:
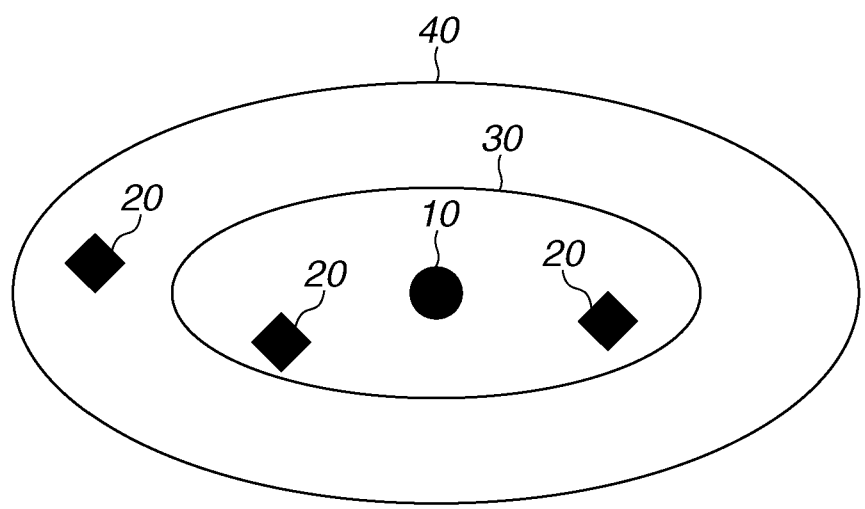
FIG. 1 is a diagram illustrating an electric power transmission system.

FIG. 1 is a diagram illustrating an electric power transmission system that includes a power transmitting apparatus 10 and a plurality of power receiving apparatuses 20. The power transmitting apparatus 10 wirelessly supplies electric power to the power receiving apparatus 20. That is, the electric power is supplied to the power receiving apparatus 20 in a non-contact manner. Moreover, the power transmitting apparatus 10 performs data communications with the power receiving apparatus 20, which are needed for the supply of power. The power receiving apparatus 20 wirelessly receives the electric power supplied from the power transmitting apparatus 10. Moreover, the power receiving apparatus 20 performs the data communications needed for the supply of power with the power transmitting apparatus 10. In a power supply area 30 illustrated in FIG. 1, the power transmitting apparatus 10 can supply power to the power receiving apparatus 20. The power supply area 30 is a range defined based on a power transmission capacity of the power transmitting apparatus 10. In a communication area 40, the data communications can be executed between the power transmitting apparatus 10 and the power receiving apparatus 20.

A relationship between the power supply area 30 and the communication area 40 is described. The power supply area 30 is smaller than the communication area 40. More specifically, the power supply area 30 is included in the communication area 40. As illustrated in FIG. 1, in a case where a plurality of power receiving apparatuses 20 is provided in the power supply area 30, the power transmitting apparatus 10 can wirelessly supply electric power to the plurality of power receiving apparatuses 20. The power transmitting apparatus 10 can sequentially and wirelessly supply power (transmit power) to the plurality of power receiving apparatuses 20 using a time-division power supply method. Moreover, the power transmitting apparatus 10 can simultaneously and wirelessly supply power to the plurality of power receiving apparatuses 20 using a simultaneous power supply method.

Figure 2:
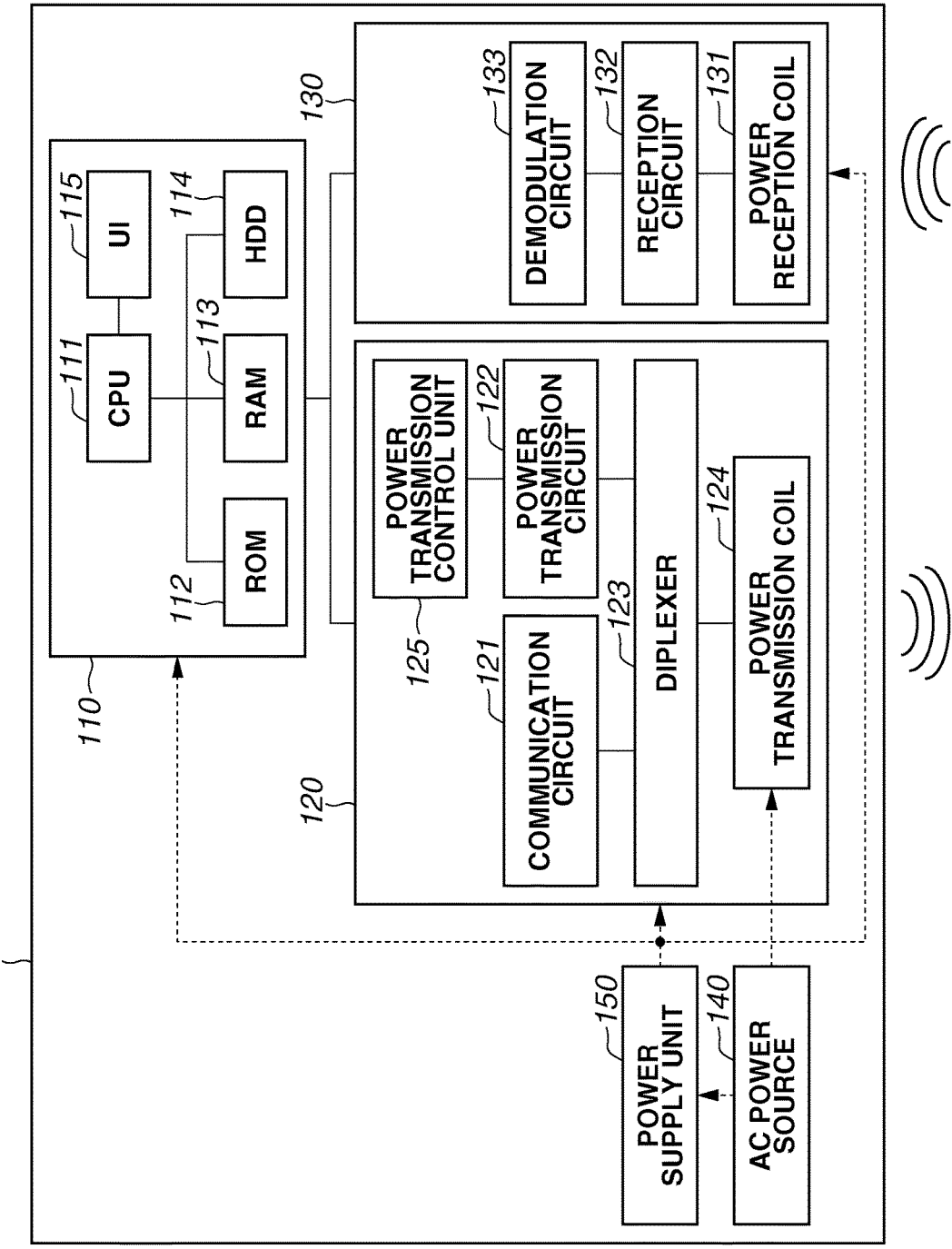
FIG. 2 is a diagram illustrating a power transmitting apparatus.

FIG. 2 is a diagram illustrating the power transmitting apparatus 10. In FIG. 2, a solid line indicates an exchange of data, whereas a dotted line indicates the supply of electric power. The power transmitting apparatus 10 includes a control unit 110, a wireless transmission unit 120, a wireless reception unit 130, an alternating current (AC) power source 140, and a power supply unit 150. The control unit 110 controls the power transmitting apparatus 10. The control unit 110 includes a central processing unit (CPU) 111, a read only memory (ROM) 112, a random access memory (RAM) 113, a hard disk drive (HDD) 114, and a user interface (UI) 115. The control unit 110 is connected to the wireless transmission unit 120 and the wireless reception unit 130 via an internal bus.

The CPU 111 processes various data, and controls the power transmitting apparatus 10. The ROM 112 is a non-volatile storage medium, and stores a boot program to be used by the CPU 111. The RAM 113 is a volatile storage medium, and temporarily stores data and programs to be used by the CPU 111. The HDD 114 is a non-volatile storage medium, and stores an operating system (OS) and applications to be used by the CPU 111. The UI 115 is an operation input unit for receiving an operation input from a user. Moreover, the UI 115 is a display unit for displaying various pieces of information. For example, the UI 115 includes a liquid crystal display unit and a touch panel. The CPU 111 detects a press on the touch panel.

The wireless transmission unit 120 wirelessly transmits electric power to the power receiving apparatus 20. The wireless power transmission unit 120 includes a communication circuit 121, a power transmission circuit 122, a diplexer 123, a power transmission coil 124, and a power transmission control unit 125. The communication circuit 121 generates a modulation signal for performing communications. The power transmission circuit 122 generates a modulation signal for transmission of electric power. The diplexer 123 combines the modulation signal generated by the communication circuit 121 and the modulation signal generated by the power transmission circuit 122. The power transmission coil 124 transmits the modulation signal combined by the diplexer 123 to the power receiving apparatus 20. The power transmission control unit 125 controls, based on a control instruction from the control unit 110, start and stop of the power transmitted by the power transmission circuit 122.

The wireless reception unit 130 receives data from the power receiving apparatus 20. The wireless reception unit 130 includes a power reception coil 131, a reception circuit 132, and a demodulation circuit 133. The power reception coil 131 receives a modulation signal for performing communications from the power receiving apparatus 20. The reception circuit 132 receives the modulation signal received by the power reception coil 131. The demodulation circuit 133 demodulates the modulation signal received by the power reception coil 131. The AC power source 140 supplies an AC voltage to the power transmission coil 124 and the power supply unit 150. The power supply unit 150 converts the AC voltage supplied by the AC power source 140 into a direct current (DC) voltage, and supplies the DC voltage to the control unit 110, the wireless transmission unit 120, and the wireless reception unit 130. A function and processing of the power transmitting apparatus 10 are performed by reading and executing the program stored in the ROM 112 or the HDD 114 by the CPU 111.

Figure 3:
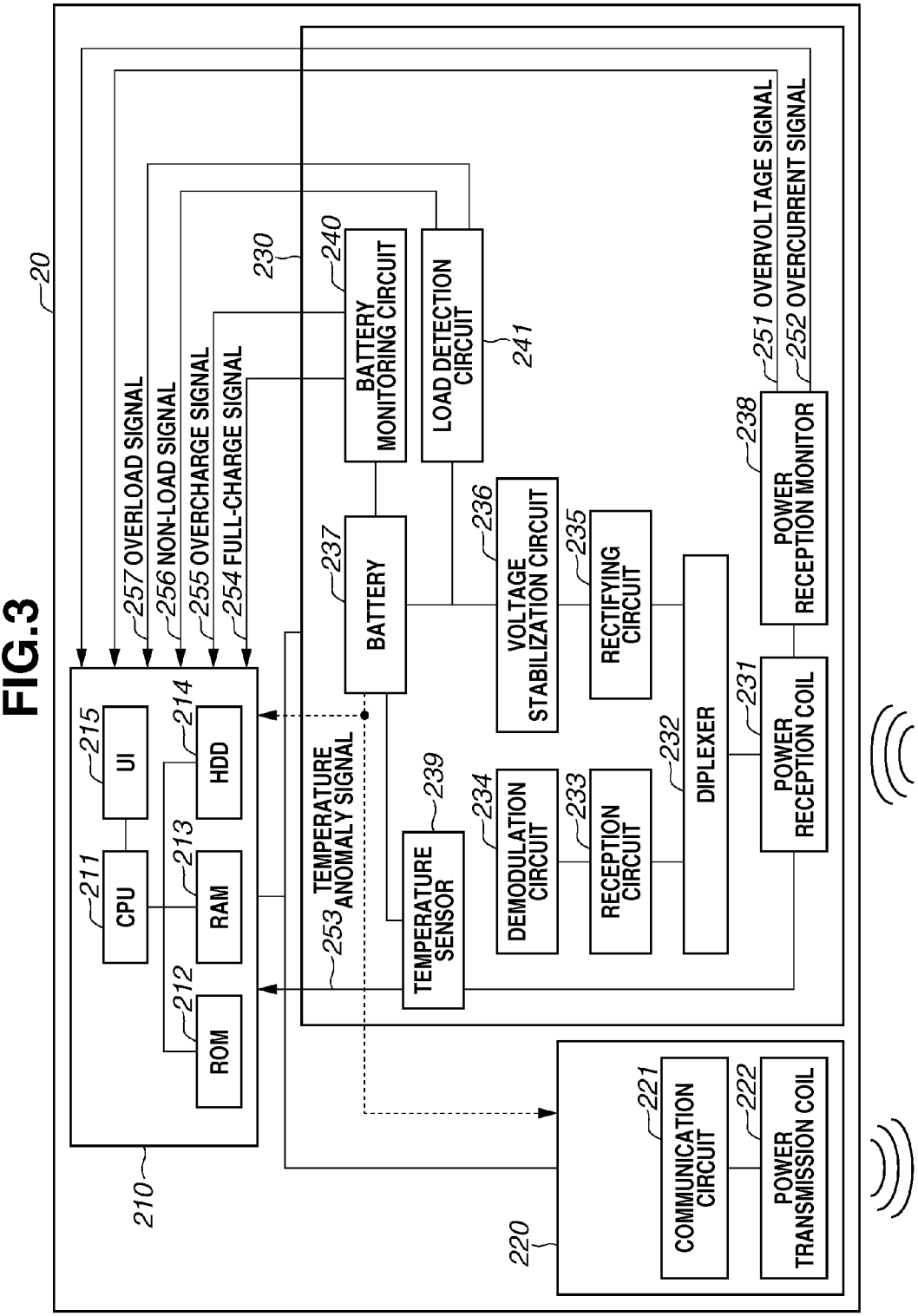
FIG. 3 is a diagram illustrating a power receiving apparatus.

FIG. 3 is a diagram illustrating the power receiving apparatus 20. In FIG. 3, a solid line indicates an exchange of data, whereas a dotted line indicates the supply of electric power. The power receiving apparatus 20 includes a control unit 210, a wireless transmission unit 220, and a wireless reception unit 230. The control unit 210 controls the power receiving apparatus 20. The control unit 210 includes a CPU 211, a ROM 212, a RAM 213, an HDD 214, and a UI 215. The control unit 210 is connected to the wireless transmission unit 220 and the wireless reception unit 230 via an internal bus. The CPU 211 processes various data, and controls the power receiving apparatus 20. The ROM 212 is a non-volatile storage medium, and stores a boot program to be used by the CPU 211. The RAM 213 is a volatile storage medium, and temporarily stores data and programs to be used by the CPU 211. The HDD 214 is a non-volatile storage medium, and stores an OS and applications to be used by the CPU 211. The UI 215 displays various information to a user, and receives various instructions from the user.

The wireless transmission unit 220 transmits data to the power transmitting apparatus 10. The wireless transmission unit 220 includes a communication circuit 221 and a power transmission coil 222. The communication circuit 221 generates a modulation signal for performing communications. The power transmission coil 222 transmits the modulation signal generated by the communication circuit 221 to the power transmitting apparatus 10. The wireless reception unit 230 wirelessly receives electric power from the power transmitting apparatus 10. The wireless reception unit 230 includes a power reception coil 231, a diplexer 232, a reception circuit 233, a demodulation circuit 234, a rectifying circuit 235, a voltage stabilization circuit 236, a battery 237, a power reception monitor 238, a temperature sensor 239, a battery monitoring circuit 240, and a load detection circuit 241.

The power reception coil 231 receives a modulation signal from the power transmitting apparatus 10. The diplexer 232 divides the modulation signal received by the power reception coil 231 into two signals, that is, a modulation signal for performing communications and a modulation signal for transmission of electric power. The reception circuit 233 receives the modulation signal for performing communications out of the signals divided by the diplexer 232. The demodulation circuit 234 demodulates the modulation signal received by the reception circuit 233. The rectifying circuit 235 generates a DC voltage by rectifying the modulation signal for transmission of electric power, the modulation signal being divided by the diplexer 232. The voltage stabilization circuit 236 stabilizes the DC voltage generated by the rectifying circuit 235.

The battery 237 receives the voltage stabilized by the voltage stabilization circuit 236, and accumulates electric power. Moreover, the battery 237 supplies a DC voltage to the control unit 210, the wireless transmission unit 220, and the wireless reception unit 230 based on the accumulated electric power. The power reception monitor 238 monitors the voltage and the current received by the power reception coil 231. The power reception monitor 238 inputs an overvoltage signal 251 to the control unit 210 if the voltage being monitored thereby exceeds a threshold value that is set beforehand. The power reception monitor 238 inputs an overcurrent signal 252 to the control unit 210 if the current being monitored thereby exceeds a threshold value that is set beforehand.

The temperature sensor 239 monitors temperature of each of the power reception coil 231, the battery 237, and the wireless reception unit 230. The temperature sensor 239 notifies the control unit 210 of a temperature anomaly signal 253 if the temperature being monitored thereby exceeds a threshold value that is set beforehand. The battery monitoring circuit 240 monitors the voltage stored in the battery 237. The battery monitoring circuit 240 inputs a full-charge signal 254 to the control unit 210 if the current being monitored thereby reaches a threshold value that is set beforehand. The full-charge signal 254 indicates that the battery 237 is fully charged. Moreover, the battery monitoring circuit 240 inputs an overcharge signal 255 if the voltage being monitored thereby exceeds a threshold value that is set beforehand.

The load detection circuit 241 detects the load applied to the battery 237 during power reception. If the battery 237 is not fully charged, and a load is not detected during the power reception, the load detection circuit 241 inputs a non-load signal 256 to the control unit 210. Moreover, if a charge amount charged to the battery 237 exceeds a threshold value that is set beforehand, the load detection circuit 241 inputs an overload signal 257 to the control unit 210. A function and processing of the power receiving apparatus 20 are performed by reading and executing the program stored in the ROM 212 or the HDD 214 by the CPU 211. The function and processing the power receiving apparatus 20 will be described below.

Figure 4:
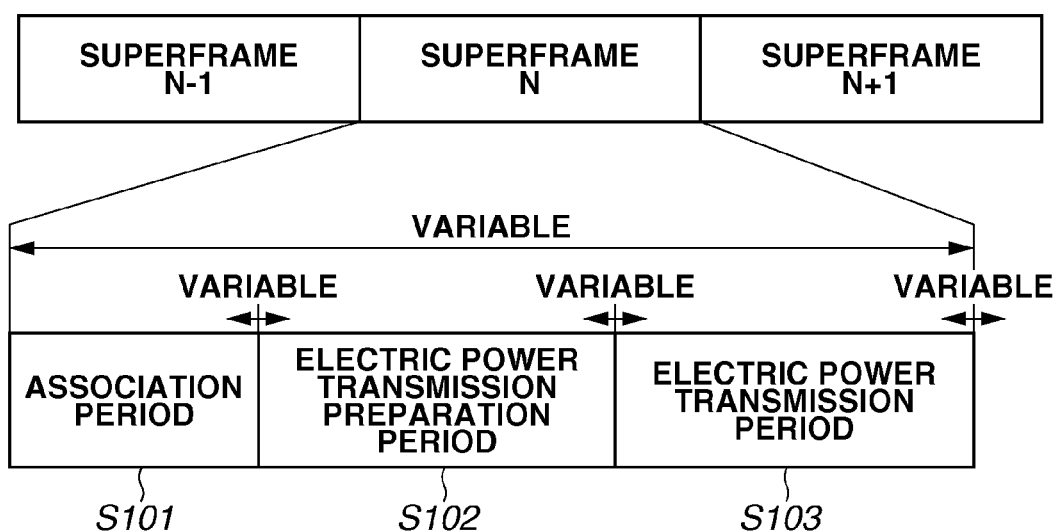
FIG. 4 is a diagram illustrating one example of a superframe.

FIG. 4 is a diagram illustrating one example of a superframe. The electric power transmission system according to the present exemplary embodiment performs power transmission processing by repeatedly using the superframes as illustrated in FIG. 4. One superframe includes a period S101 (an association period), a period S102 (an electric power transmission preparation period), and a period S103 (an electric power transmission period). Each of the periods is variable. In the period S101, the power transmitting apparatus 10 checks device identification (ID) and the necessity of electric power with respect to the power receiving apparatus 20. When the power transmitting apparatus 10 receives the device ID and a notification of the power necessity from the power receiving apparatus 20, the period S101 is shifted to the period S102. A time in which the period S101 is shifted to the period S102 is also variable.

In the period S102, the power transmitting apparatus 10 can transmit a data request to the power receiving apparatus 20. With the data request, the power transmitting apparatus 10 can request device ID of the power receiving apparatus 20. The power receiving apparatus 20 can transmit an acknowledgement as a response to the data request from the power transmitting apparatus 10. The power receiving apparatus 20 transmits an acknowledgement including the device ID with respect to the device ID request. Each length of the response frame and the acknowledgement frame is variable. When the period S102 is finished, the processing proceeds to the period S103. A time in which the period S102 is shifted to the period S103 is also variable. In the period S103, the power transmitting apparatus 10 transmits electric power to the power receiving apparatus 20. In the period S103, the power receiving apparatus 20 can transmit a frame to the power transmitting apparatus 10 even if there is not a request frame from the power transmitting apparatus 10.

Figure 5:
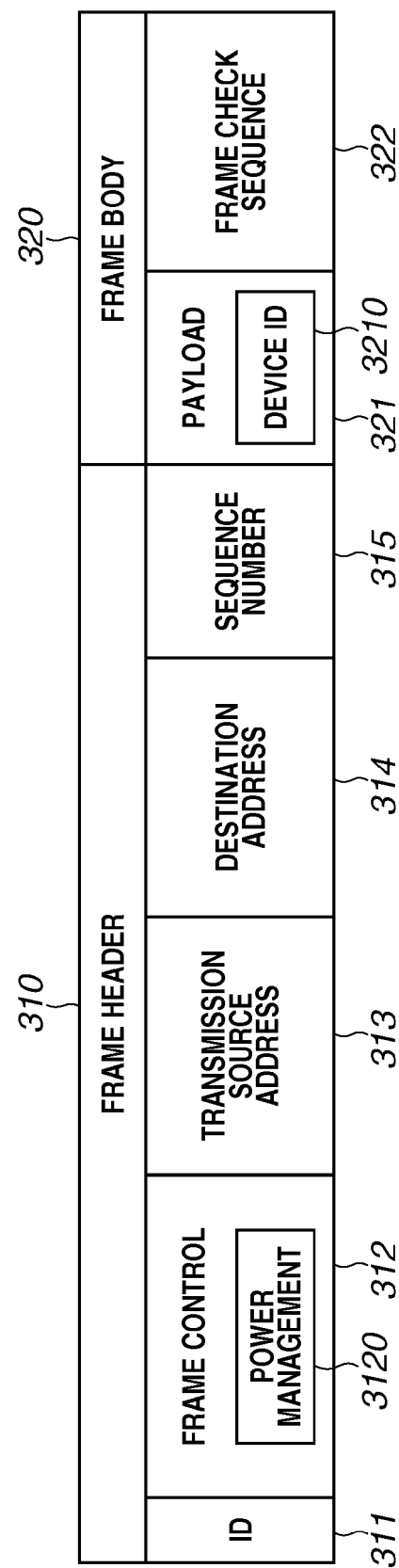
FIG. 5 is a diagram illustrating one example of a frame format.

FIG. 5 is a diagram illustrating one example of a frame format. In the above superframe, data communications using packets in the frame format as illustrated in FIG. 5 are performed. Such data communications enable transmission and reception of data necessary to start power transmission. A frame header 310 indicates, for example, a destination of data transfer. The frame header 310 includes ID 311, a frame control 312, a transmission source address 313, a destination address 314, and a sequence number 315. The ID 311 is used when the electric power transmission system performs data communications.

The frame control 312 is information for an exchange of data of the power receiving apparatus 20. The frame control 312 includes a power management 3120. The power management 3120 is data used to check the necessity of electric power. The transmission source address 313 indicates an address of a transmission source in the data transfer. The destination address 314 indicates an address of a destination to which data is transferred. The sequence number 315 indicates a frame number. A frame body 320 indicates information about a body of the data in the data transfer. The frame body 320 includes a payload 321 and a frame check sequence 322. The payload 321 is the body of the data. For example, device ID 3210 is assigned to the payload 321. The device ID 3210 is identification information of the power receiving apparatus 20. The frame check sequence 322 is data used for an error check on the payload 321.

Figure 6:
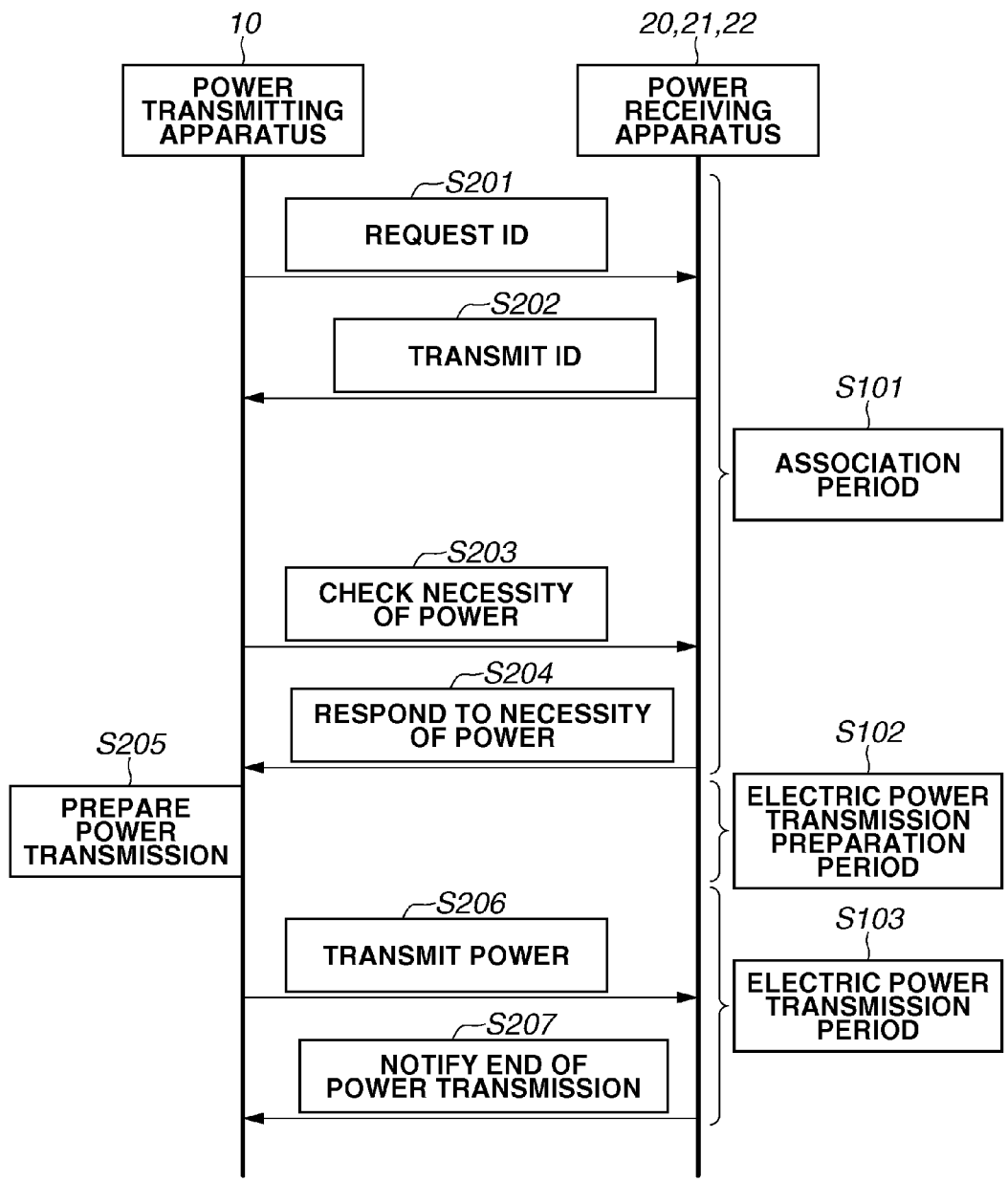
FIG. 6 is a sequence diagram illustrating electric power transmission processing.

FIG. 6 is a sequence diagram illustrating power transmission processing performed between the power transmitting apparatus 10 and the power receiving apparatus 20 using a superframe. In the following processing, the data communications for the power transmission are performed using the above-described superframe. In step S201, the power transmitting apparatus 10 requests ID from the power receiving apparatus 20. The power transmitting apparatus 10 uses the ID 311 in a frame format. In step S202, the power transmitting apparatus 10 receives the ID from the power receiving apparatus 20. The power receiving apparatus 20 uses the ID 311 in the frame format. Subsequently, in step S203, the power transmitting apparatus 10 checks whether the power receiving apparatus 20 needs electric power. The power transmitting apparatus 10 uses the power management 3120 in the frame format.

In step S204, if the power receiving apparatus 20 needs electric power, the power receiving apparatus 20 notifies the power transmitting apparatus 10 of the necessity of power. In step S204, if electric power is not needed, the power receiving apparatus 20 notifies the power transmitting apparatus 10 of the unnecessity of power. The power receiving apparatus 20 uses the power management 3120 in the frame format. The power transmitting apparatus 10 determines the power receiving apparatus 20 as a power transmission target based on the response result including the necessity of receiving electric power. In step S205, the power transmitting apparatus 10 prepares for the power transmission. Then, the power receiving apparatus 20 transmits device ID as a response frame to the power transmitting apparatus 10. The power receiving apparatus 20 uses the device ID 3210 in the frame format.

Subsequently, in step S206, the power transmitting apparatus 10 transmits power to the power receiving apparatus 20 (the power transmitting apparatus 10 performs power transmission processing). In step S207, when the battery 237 becomes fully charged, the power receiving apparatus 20 notifies the power transmitting apparatus 10 of the end of power transmission. The power receiving apparatus 20 uses the power management 3120 in the frame format. Thus, the data communications for the power transmission using one superframe is finished. Accordingly, the data is transmitted and received within the superframe, thereby performing the data communications for the wireless power transmission.

Figure 7:
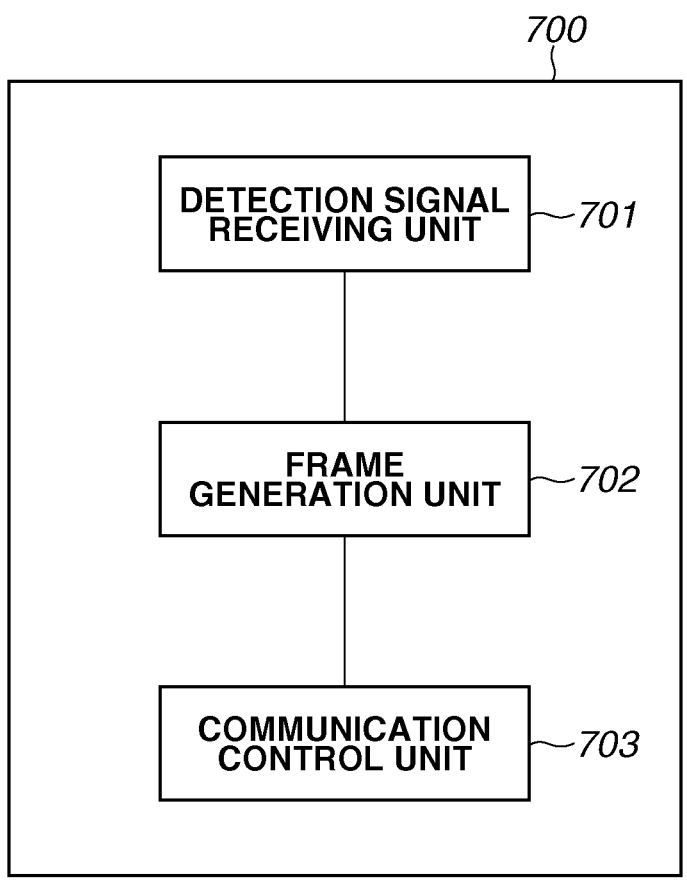
FIG. 7 is a diagram illustrating a processing unit of the power receiving apparatus.

FIG. 7 is a diagram illustrating a processing unit 700 of the power receiving apparatus 20. The processing unit 700 includes a detection signal receiving unit 701, a frame generation unit 702, and a communication control unit 703. The detection signal receiving unit 701 receives a detection signal. The detection signal is an overvoltage signal 251, an overcurrent signal 252, a full-charge signal 254, an overcharge signal 255, a temperature anomaly signal 253, a non-load signal 256, or an overload signal 257. The frame generation unit 702 generates a frame of an end request for power transmission based on the detection signal received by the detection signal receiving unit 701. The end request is information for requesting that the power transmission performed by the power transmitting apparatus 10 should be finished. The frame generation unit 702 writes in the power management 3120 of the frame a content to be notified to the power transmitting apparatus 10 based on the detection signal. The notification content is information indicating a reason for transmitting the end request. Moreover, the frame generation unit 702 generates the frame body 320 and the frame header 310 other than the power management 3120, and acquires the end request frame. In step S207 illustrated in FIG. 6, the communication control unit 703 transmits the end request frame to the power transmitting apparatus 10 through the wireless transmission unit 220.

Figure 8:
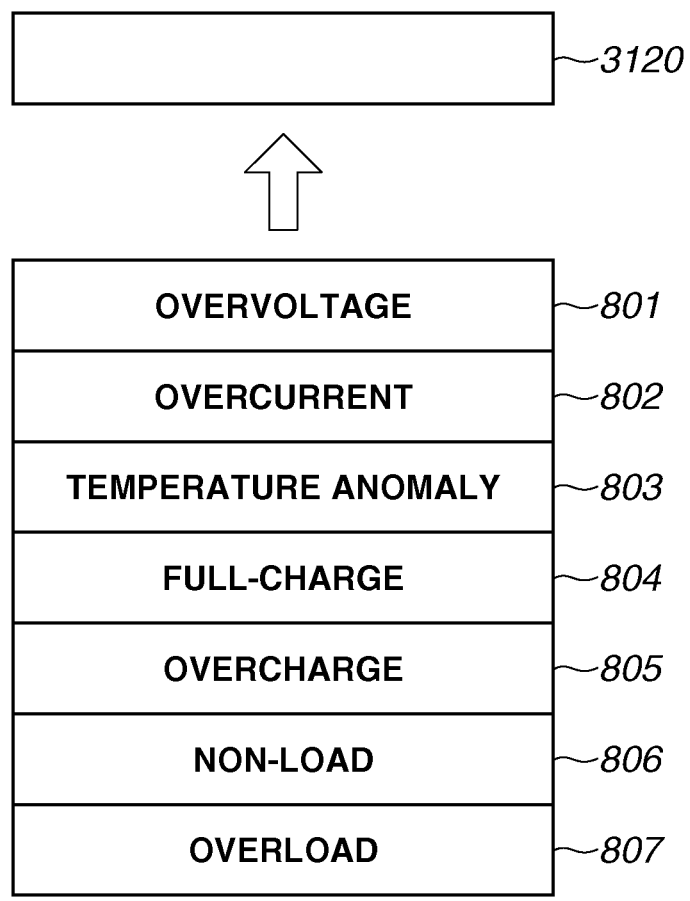
FIG. 8 is a diagram illustrating a notification content written in a power management.

FIG. 8 is a diagram illustrating the notification contents written in the power management 3120. The notification contents include an overvoltage 801, an overcurrent 802, a temperature anomaly 803, a full-charge 804, an overcharge 805, a non-load 806, and an overload 807. These notification contents 801 through 807 are generated when the overvoltage signal 251, the overcurrent signal 252, the temperature anomaly signal 253, the full-charge signal 254, the overcharge signal 255, the non-load signal 256, and the overload signal 257 are received respectively. When the detection signal receiving unit 701 receives the overvoltage signal 251, the frame generation unit 702 generates the overvoltage 801. Then, the generated overvoltage 801 is written in the power management 3120. Similarly, when the detection signal receiving unit 701 receives the overcurrent signal 252, the temperature anomaly signal 253, and the full-charge signal 254, the frame generation unit 702 generates the overcurrent 802, the temperature anomaly 803, and the full-charge 804, respectively. Each of these generated notification contents is written in the power management 3120. Moreover, when the detection signal receiving unit 701 receives the overcharge signal 255, the non-load signal 256, and the overload signal 257, the frame generation unit 702 generates the overcharge 805, the non-load 806, and the overload 807, respectively. Each of these generated notification contents is written in the power management 3120. The power management 3120 may include information other than the notification contents.

Figure 9:
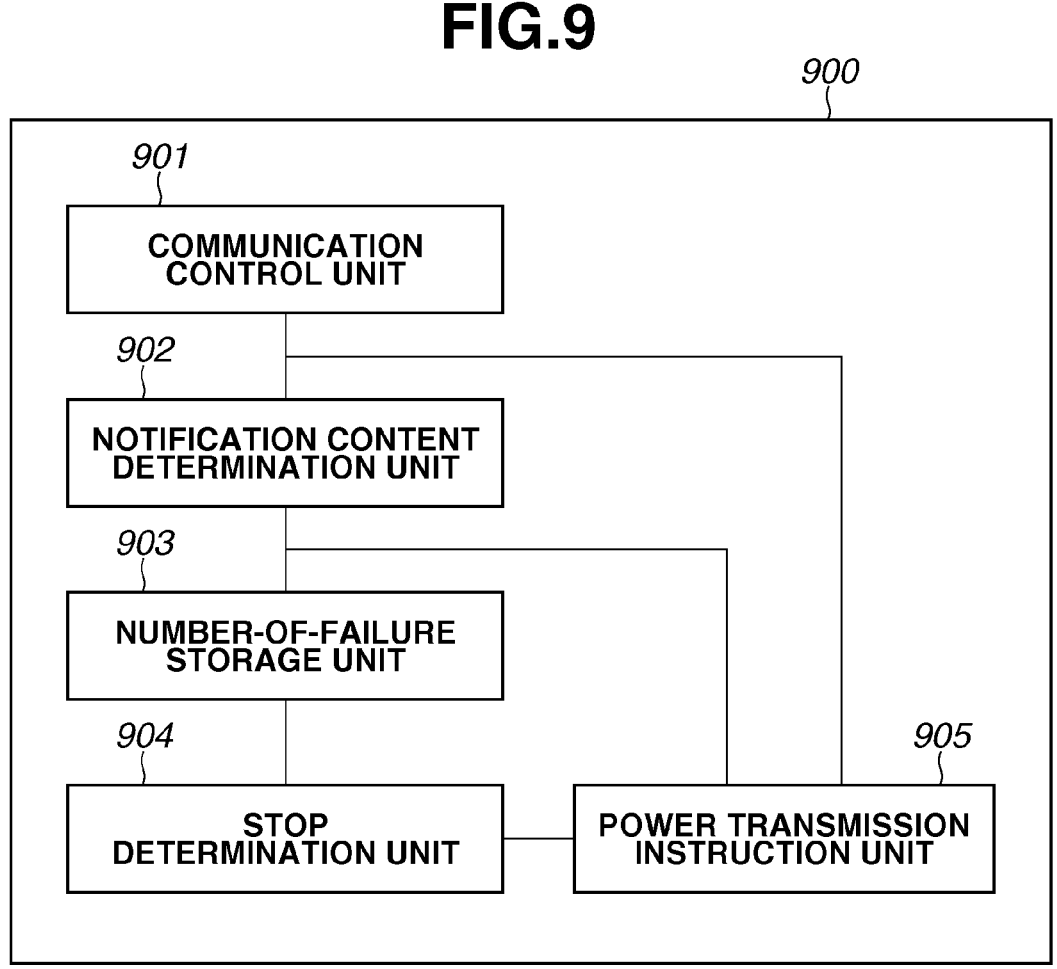
FIG. 9 is a diagram illustrating a processing unit of the power transmitting apparatus.

FIG. 9 is a diagram illustrating a processing unit 900 of the power transmitting apparatus 10. The processing unit 900 includes a communication control unit 901, a notification content determination unit 902, a number-of-failures storage unit 903, a stop determination unit 904, and a power transmission instruction unit 905. The communication control unit 901 receives an end request frame from the power receiving apparatus 20 through the wireless reception unit 130. The notification content determination unit 902 determines the notification content written in the power management 3120 of the frame. More specifically, the notification content determination unit 902 determines whether the notification content indicates any of normal completion of charging, an abnormality in the power receiving apparatus 20, or an abnormality in the power transmitting apparatus 10.

In the present exemplary embodiment, in a case where the notification content is the full-charge 804, the notification content determination unit 902 determines that the charging is completed normally. In a case where the notification content is the overvoltage 801 or the overcurrent 802, the notification content determination unit 902 determines there is an abnormality in the power transmitting apparatus 10. In a case where the notification content is the temperature anomaly 803, the overcharge 805, the non-load 806, or the overload 807, the notification content determination unit 902 determines that there is an abnormality in the power receiving apparatus 20. The number-of-failures storage unit 903 stores the number of times that the notification content regarding the abnormality in the power receiving apparatus 20 is received as the number of failures. The notification content determination unit 902 writes the number of failures in the number-of-failures storage unit 903. That is, in a case where the notification content indicates the abnormality in the power receiving apparatus 20, the notification content determination unit 902 adds 1 to a value of the number of failures stored in the number-of-failures storage unit 903.

The stop determination unit 904 compares the number of failures stored in the number-of-failures storage unit 903 with a threshold value, and determines whether to stop power transmission based on the comparison result. The threshold value is stored, for example, in the ROM 112 beforehand. The threshold value can be optionally set by a user through the UI 115. The power transmission instruction unit 905 instructs the power transmission control unit 125 to start and stop power transmission. The power transmission instruction unit 905 instructs the power transmission control unit 125 to stop power transmission not only to the power receiving apparatus 20 to which the power is being transferred from the power transmitting apparatus 10, but also to a power receiving apparatus 20 that is scheduled to receive the power from the power transmitting apparatus 10.

FIG. 10 is a flowchart illustrating end request transmission processing performed by the power receiving apparatus 20. The end request transmission processing is executed while the power receiving apparatus 20 is receiving the power supplied from the power transmitting apparatus 10. That is, this processing is executed in the electric power transmission period S103. In step S1001, the detection signal receiving unit 701 of the power receiving apparatus 20 waits for a detection signal. If the detection signal receiving unit 701 receives the detection signal (YES in step S1001), the operation proceeds to step S1002. In step S1002, the frame generation unit 702 generates a notification content to be written in the power management 3120 based on the detection signal received in step S1001 by the detection signal receiving unit 701.

In step S1003, the frame generation unit 702 writes the notification content in the power management 3120, and generates an end request frame by generating the frame header 310 and the frame body 320. Subsequently, in step S1004, the communication control unit 703 transmits the end request frame generated in step S1003 by the frame generation unit 702 to the power transmitting apparatus 10 through the wireless transmission unit 220. Thus, the end request transmission processing by the power receiving apparatus 20 is completed. With the end request transmission processing, therefore, the power receiving apparatus 20 transmits the notification content indicating a reason for end request transmission along with the end request to the power transmitting apparatus 10.

FIG. 11 is a flowchart illustrating power transmission stop processing performed when the power transmitting apparatus 10 supplies electric power in a simultaneous manner. The simultaneous power supply represents a power supply method enabling electric power to be concurrently supplied to a plurality of power receiving apparatuses 20 as power transmission targets in an electric power transmission period within one superframe. In step S1101, the communication control unit 901 of the power transmitting apparatus 10 receives an end request frame from one of the plurality of power receiving apparatuses 20 to which power is being transmitted (the communication control unit 901 performs reception processing). The end request frame is received through the wireless reception unit 130. In step S1102, the power transmission instruction unit 905 instructs the power transmission control unit 125 to stop power transmission to the power receiving apparatus 20 of a transmission source of the end request frame. Accordingly, the power transmission control unit 125 stops power transmission to the power receiving apparatus 20 of the transmission source of the end request frame.

Subsequently, in step S1103, the notification content determination unit 902 checks the notification content written in the power management 3120 in the end request frame. If the notification content is full-charge (YES in step S1103), that is, the notification content indicates that the charging is completed normally, the operation proceeds to step S1104. In step S1104, the power transmission instruction unit 905 checks whether power transmission to all the power receiving apparatuses 20 as power transmission targets in the superframe in execution is finished. That is, the power transmission instruction unit 905 checks whether power transmission to the power receiving apparatuses 20 to which power is simultaneously transmitted is completed. If power transmission to all the power receiving apparatuses 20 is finished (YES in step S1104), the power transmission stop processing ends. On the other hand, if there is a power receiving apparatus 20 that has not completed power transmission thereto (NO in step S1104), the operation returns to step S1101.

If the notification content determination unit 902 determines that the notification content is other than full-charge, that is, the notification content indicates an abnormality in the power transmission (NO in step S1103), the operation proceeds to step S1105. If the notification content determination unit 902 determines that the notification content is an overvoltage or an overcurrent, that is, there is an abnormality in the power transmitting apparatus 10 (YES in step S1105), the operation proceeds to step S1108. In step S1108, the power transmission instruction unit 905 determines that power transmission to all the power receiving apparatuses 20 as the power transmission targets in the superframe in execution should be stopped. That is, power transmission to all the power receiving apparatuses 20 to which power is being transmitted should be stopped (the power transmission instruction unit 905 performs power transmission determination processing). Accordingly, the power transmission instruction unit 905 instructs the power transmission control unit 125 to stop power transmission to all the power receiving apparatuses 20 to which power is being transmitted. That is, in a case where the abnormality content indicates that there is an abnormality in the power transmitting apparatus 10, the notification content determination unit 902 determines to stop power transmission to all the power receiving apparatuses 20 which have not completed power transmission thereto. Then, the notification content determination unit 902 issues an instruction to the power transmission instruction unit 905. Accordingly, the power transmission instruction unit 905 instructs the power transmission control unit 125 to stop power transmission to all the power receiving apparatuses 20 based on the instruction from the notification content determination unit 902.

If the notification content is any of a temperature anomaly, an overcharge, a non-load, or an overload, that is, there is an abnormality in the power receiving apparatus 20 (NO in step S1105), the operation proceeds to step S1106. In step S1106, the notification content determination unit 902 adds 1 to a value of the number of failures stored in the number-of-failures storage unit 903, and stores the resultant value as the number of failures in the number-of-failures storage unit 903 (the notification content determination unit 902 performs number-of-times management processing). In step S1107, the stop determination unit 904 compares the number of failures with a threshold value. If the number of failures is less than the threshold value (NO in step S1107), the operation proceeds to step S1104. If the number of failures is the threshold value or greater (YES in step S1107), the operation proceeds to step S1108. That is, if the number of failures is the threshold value or greater, the power transmission instruction unit 905 stops power transmission to all the power receiving apparatuses 20 of the power transmission targets (except for the power receiving apparatus 20 of a transmission source of the end request). Accordingly, the power transmitting apparatus 10 completes the power transmission stop processing in the simultaneously power supply.

FIG. 12 is a flowchart illustrating the power transmission stop processing performed when the power transmitting apparatus 10 supplies power in a time-division manner. The time-division power supply represents a power supply method enabling electric power to be sequentially supplied to a plurality of power receiving apparatuses 20 as power supply targets in an electric power transmission period within one superframe. The power transmission stop processing illustrated in FIG. 12 is described by referring to the difference between the time-division power supply in FIG. 12 and the simultaneous power supply described in FIG. 11. The processing similar to that in the power transmission stop processing in the simultaneous power supply in FIG. 11 is given the same reference numeral.

If the notification content determination unit 902 determines that the notification content is full-charge (YES in step S1103), the operation proceeds to step S1201. In step S1201, the power transmission instruction unit 905 checks whether power transmission to all the power receiving apparatuses 20 as power transmission targets in the superframe in execution is finished. That is, the power transmission instruction unit 905 checks whether power transmission to all the power receiving apparatuses 20 to which power should be sequentially transmitted in a time-division manner is finished. If power transmission to all the power receiving apparatuses 20 is finished (YES in step S1201), the power transmission stop processing ends. On the other hand, if there is a power receiving apparatus 20 that has not completed power transmission thereto (NO in step S1201), the operation proceeds to step S1202. In step S1202, the power transmission instruction unit 905 instructs the power transmission control unit 125 to start power transmission to a next power receiving apparatus 20. The next power receiving apparatus 20 is an apparatus scheduled to receive power after the power receiving apparatus 20 of the end request transmission source receives the power.

If the number of failures is less than the threshold value (NO in step S1107), the operation proceeds to step S1201. If the number of failures is the threshold value or greater (YES in step S1107), the operation proceeds to step S1203. In step S1203, the power transmission instruction unit 905 stops power transmission to the power receiving apparatus 20 having not completed power transmission thereto in the frame in execution. The power receiving apparatus 20 having not completed power transmission thereto is an apparatus that was scheduled to sequentially receive power after the next power receiving apparatus 20 of the end request transmission source in the superframe in execution. Thus, the power transmitting apparatus 10 completes the power transmission stop processing in the time-division power supply.

Therefore, the power transmitting apparatus 10 according to the present exemplary embodiment stops power transmission to the power receiving apparatus 20 of the end request transmission source based on the notification content received from the power receiving apparatus 20. In addition, the power transmitting apparatus 10 determines, based on the notification content received from the power receiving apparatus 20, whether to stop power transmission to other power receiving apparatuses 20 that have not completed power transmission thereto. Upon receipt of an end request due to an abnormality in the power transmitting apparatus 10, the power transmitting apparatus 10 stops power transmission to all the power receiving apparatuses having not completed power transmission thereto. Moreover, the power transmitting apparatus 10 stops power transmission to all the power receiving apparatuses 20 having not completed power transmission thereto according to the number of abnormalities that have occurred in the power receiving apparatus 20. This can prevent a failure of the power receiving apparatus 20. That is, in a case where an abnormality relating to the power transmission occurs, the electric power transmission system according to the present exemplary embodiment can appropriately deal with the abnormality.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-100390 filed May 10, 2013, which is hereby incorporated by reference herein in its entirety.

What is claimed is:

1. A power supplying apparatus comprising:
one or more processors; and
memory storing instructions that, when executed by the one or more processors, cause the power supplying apparatus to execute steps of:
supplying power wirelessly to one or more power receiving apparatuses including a first power receiving apparatus, wherein power is not supplied to a second power receiving apparatus while power is supplied to the first power receiving apparatus;
receiving a notification from the first power receiving apparatus;
controlling the power supplying apparatus to change a supply destination of the power being supplied to the first power receiving apparatus, from the first power receiving apparatus to the second power receiving apparatus, in response to the received notification, in a case where the received notification is related to an error of power supply and history information indicating a number of times of the error indicates a number which is smaller than or equal to a predetermined number; and
controlling to stop supplying power to all of the power receiving apparatuses which are receiving power supply from the power supplying apparatus, in response to the received notification, in a case where the received notification indicates a an error of power supply and the history information indicating the number of times of the error indicates a number which is larger than the predetermined number.

2. The power supplying apparatus according to claim 1, wherein the error is an overvoltage or an overcurrent.

3. The power supplying apparatus according to claim 1, wherein the received notification indicates completion of charging.

4. The power supplying apparatus according to claim 3, wherein the error is an overvoltage or an overcurrent.

5. A method for controlling a power supplying apparatus, the method comprising:

supplying power wirelessly to one or more power receiving apparatuses including a first power receiving apparatus, wherein the power supplying apparatus does not supply power to a second power receiving apparatus while the power supplying apparatus supplies power to the first power receiving apparatus;

receiving a notification from the first power receiving apparatus; and controlling the power supplying apparatus to change a supply destination of the power being supplied to the first power receiving apparatus, from the first power receiving apparatus to the second power receiving apparatus, in response to the received notification, in a case where the received notification is related to an error of power supply and history information indicating a number of times of the error indicates a number which is smaller than or equal to a predetermined number; and controlling the power supplying apparatus to stop supplying power to all of the power receiving apparatuses which are receiving power supply from the power supplying apparatus, in response to the received notification, in a case where the received notification indicates an error of power supply and the history information indicating the number of times of the error indicates a number which is larger than the predetermined number.

6. A non-transitory computer-readable storage medium storing computer executable instructions that, when executed, cause an apparatus to execute a process for supplying power, the process comprising:

supplying power wirelessly to one or more power receiving apparatuses including a first power receiving apparatus, wherein the power supplying apparatus does not supply power to a second power receiving apparatus while the power supplying apparatus supplies power to the first power receiving apparatus;

receiving a notification from the first power receiving apparatus; and controlling the power supplying apparatus to change a supply destination of the power being supplied to the first power receiving apparatus, from the first power receiving apparatus to the second power receiving apparatus, in response to the received notification, in a case where the received notification is related to an error of power supply and history information indicating a number of times of the error indicates a number which is smaller than or equal to a predetermined number; and controlling the power supplying apparatus to stop supplying power to all of the power receiving apparatuses which are receiving power supply from the power supplying apparatus, in response to the received notification, in a case where the received notification indicates an error of power supply and the history information indicating the number of times of the error indicates a number which is larger than the predetermined number.

* * * * *